United States Patent
Yoshida et al.

(10) Patent No.: US 11,480,887 B2
(45) Date of Patent: Oct. 25, 2022

(54) OPTICAL SCANNING DEVICE AND IMAGE FORMING DEVICE

(71) Applicant: KYOCERA Document Solutions Inc., Osaka (JP)

(72) Inventors: Shingo Yoshida, Osaka (JP); Tatsuya Kobayashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/341,741

(22) Filed: Jun. 8, 2021

(65) Prior Publication Data
US 2021/0382409 A1    Dec. 9, 2021

(30) Foreign Application Priority Data
Jun. 9, 2020  (JP) .............................. JP2020-100269

(51) Int. Cl.
*G03G 15/043* (2006.01)
*G02B 27/00* (2006.01)
*G03G 21/00* (2006.01)

(52) U.S. Cl.
CPC ....... *G03G 15/043* (2013.01); *G02B 27/0006* (2013.01); *G03G 21/00* (2013.01)

(58) Field of Classification Search
CPC ... G03G 15/043; G03G 21/00; G02B 27/0006
See application file for complete search history.

(56) References Cited

U.S. PATENT DOCUMENTS

| | | | | |
|---|---|---|---|---|
| 2009/0245850 | A1* | 10/2009 | Kawai | G03G 15/04054 399/98 |
| 2009/0245866 | A1* | 10/2009 | Ueda | G03G 21/1666 399/123 |
| 2014/0112676 | A1* | 4/2014 | Mori | G03G 15/55 399/49 |

FOREIGN PATENT DOCUMENTS

| JP | 2004-333799 | 11/2004 |
|---|---|---|
| JP | 2012-042588 | 3/2012 |

* cited by examiner

*Primary Examiner* — Gregory H Curran
(74) *Attorney, Agent, or Firm* — Lex IP Meister, PLLC

(57) ABSTRACT

An optical scanning device includes a housing that houses an optical system for generating a light ray for optical scanning, and has a dustproof glass for emitting the light ray to an outside, and a cleaning system that is assembled to the housing and cleans the dustproof glass. The cleaning system includes a cleaning member, and a holder that holds the cleaning member, and with the holder moved in a specified movement direction relative to the dustproof glass, the cleaning member cleans the dustproof glass. The cleaning member includes a cleaner member that is adapted to contact a surface of the dustproof glass, and a pressing member that has a pressing surface for pressing the cleaner member toward the dustproof glass and is formed of an elastic body. In the movement direction, a width of the cleaner member is wider than a width of the pressing surface.

9 Claims, 14 Drawing Sheets

OPTICAL SCANNING DEVICE AND IMAGE FORMING DEVICE

INCORPORATION BY REFERENCE

This application is based upon, and claims the benefit of priority from, corresponding Japanese Patent Application No. 2020-100269 filed in the Japan Patent Office on Jun. 9, 2020, the entire contents of which are incorporated herein by reference.

BACKGROUND

Field of the Invention

The present disclosure relates to an optical scanning device that generates optical scanning light rays irradiated to a scanning object, and an image forming device provided with the optical scanning device.

Description of Related Art

An optical scanning device that generates a scanning light includes a scanning optical system including a light source, a polygon mirror, and a scanning lens, and a housing that houses the scanning optical system and protects the scanning optical system from any dust. The scanning light is irradiated to a specific scanning object through a window portion provided in the housing and made of transparent glass. In the case of an image forming device, the scanning object is a photoconductor drum, and an electrostatic latent image is formed on the peripheral surface of the photoconductor drum by irradiation of the scanning light.

When the window portion is contaminated, the scanning light will not be properly irradiated to the scanning object. Due to this, it is required that the window portion be cleaned automatically on a regular basis. For this automatic cleaning, the optical scanning device is provided with a cleaning system that, along the window portion, reciprocally moves a cleaning unit which includes a cleaning member for slidably contacting the window portion and a holder for holding the cleaning member. The cleaning member includes a cleaner member for contacting the window portion, and the cleaner member is held by the holder.

SUMMARY

An optical scanning device according to a first aspect of the present disclosure includes a housing that houses an optical system for generating a light ray for optical scanning, and has a window portion for emitting the light ray to an outside, and a cleaning system that is assembled to the housing and cleans the window portion. The cleaning system includes a cleaning member, and a holder that holds the cleaning member, and with the holder moved in a specified movement direction relative to the window portion, the cleaning member cleans the window portion. The cleaning member includes a cleaner member that is adapted to contact a surface of the window portion, and a pressing member that has a pressing surface for pressing the cleaner member toward the window portion and is formed of an elastic body. In the movement direction, a width of the cleaner member is wider than a width of the pressing surface.

An image forming device according to a second aspect of the present disclosure includes an image carrier, and the optical scanning device, wherein the optical scanning device irradiates a scanning light to the image carrier based on image information.

DETAILED DESCRIPTION

Embodiments of the present disclosure are described in detail based on the following drawings. The present embodiment shows an example in which an optical scanning device according to the present disclosure is applied to a color printer 1 which is an example of an image forming device. The image forming device may be a monochrome printer, a facsimile device, or a multifunction machine. The optical scanning device according to the present disclosure may be applied to a device other than the image forming device.

Overall Configuration of Image Forming Device

Figure 1:
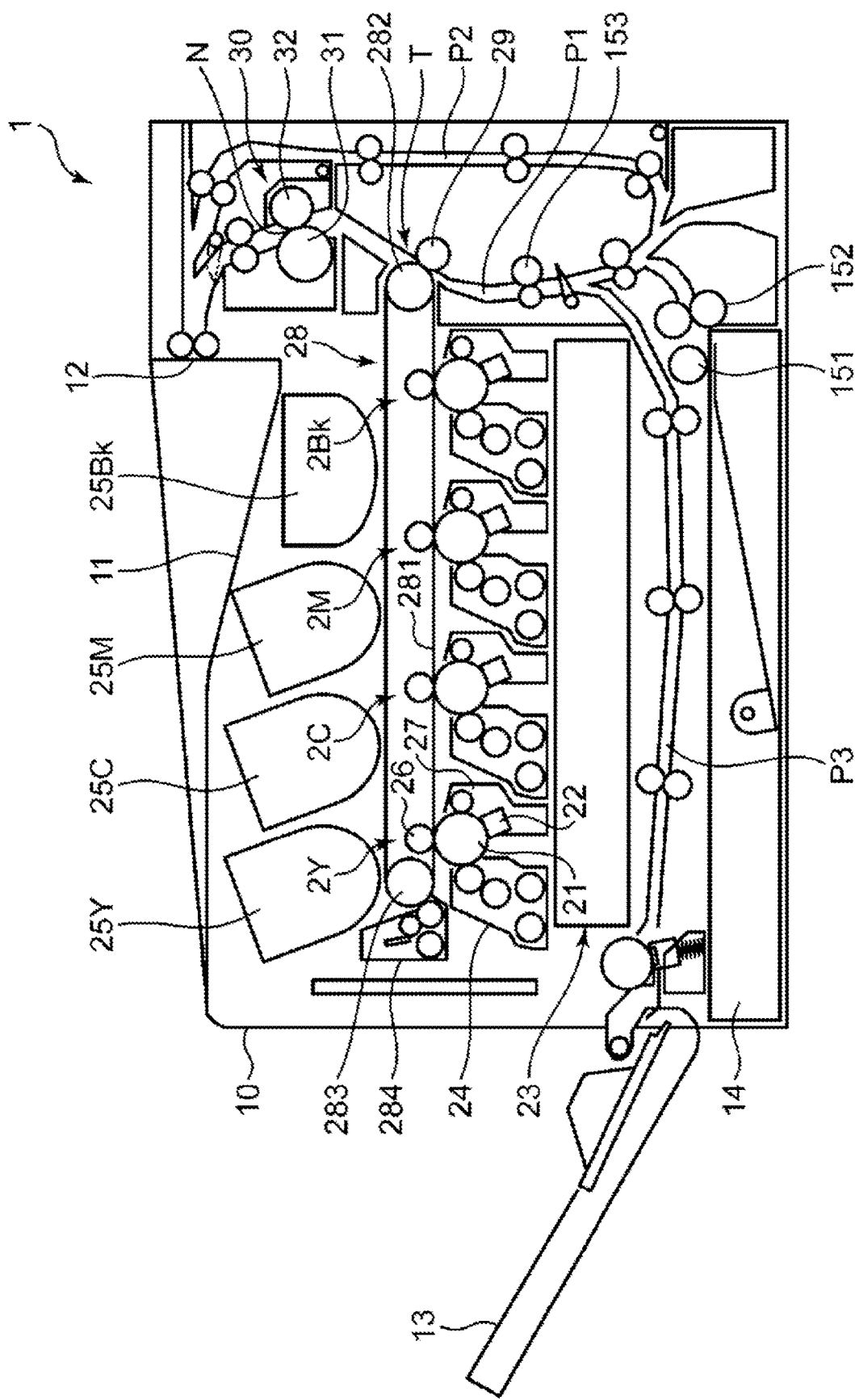
FIG. 1 is a schematic cross-sectional view illustrating an internal structure of an image forming device according to an embodiment of the present disclosure.

FIG. 1 is a schematic cross-sectional view illustrating the internal structure of the color printer 1 according to an embodiment of the present disclosure. The color printer 1 includes a body housing 10 formed of a rectangular housing, and also includes image forming units 2Y, 2C, 2M, and 2Bk, an optical scanning unit 23 (optical scanning device), an intermediate transfer unit 28, and a fixing unit 30 which are housed in the body housing 10. A paper discharge tray 11 is provided on the upper surface of the body housing 10. A sheet discharge port 12 is open opposite the paper discharge tray 11. In addition, a manual feed tray 13 is mounted to the side wall of the body housing 10 in an openable manner. A paper feed cassette 14, which houses a sheet to be subjected to image formation processing, is detachably mounted to the lower portion of the body housing 10.

The image forming units 2Y, 2C, 2M, and 2Bk form toner images of yellow, cyan, magenta, and black colors based on image information transmitted from an external device. Each of the image forming units 2Y, 2C, 2M and 2Bk includes a photoconductor drum 21 (image carrier) which carries an electrostatic latent image and a toner image, a charger 22 which charges the peripheral surface of the photoconductor drum 21, the optical scanning unit 23 which irradiates a scanning light to the photoconductor drum 21 based on the image information to thereby form an electrostatic latent image, a developer 24 which attaches a developer to the electrostatic latent image to thereby form the toner image, yellow, cyan, magenta and black toner containers 25Y, 25C, 25M and 25Bk which supply respective color toners to the developer 24, a primary transfer roller 26 which primarily transfers the toner image formed on the photoconductor drum 21, and a cleaning device 27 for removing any residual toner from the peripheral surface of the photoconductor drum 21. Of these, the optical scanning unit 23 will be described in detail below.

The intermediate transfer unit 28 primarily transfers the toner image formed on the photoconductor drum 21. The intermediate transfer unit 28 includes a transfer belt 281 that circulates while contacting the peripheral surface of each photoconductor drum 21, and a drive roller 282 and a driven roller 283 across which the transfer belt 281 is bridged. The transfer belt 281 is pressed against the peripheral surface of each photoconductor drum 21 by the primary transfer roller 26. The toner images on the photoconductor drums 21 of respective colors are superimposed on the same spot on the transfer belt 281 and primarily transferred. With this, a full-color toner image is formed on the transfer belt 281.

Opposite the drive roller 282, there is disposed a secondary transfer roller 29 which forms a secondary transfer nip portion T with the transfer belt 281 sandwiched. The full-color toner image on the transfer belt 281 is secondarily transferred onto the sheet in the secondary transfer nip portion T. Toner that remains on the peripheral surface of the transfer belt 281 without being transferred onto the sheet is collected by a belt cleaning device 284 disposed opposite the driven roller 283.

The fixing unit 30 includes a fixing roller 31 in which a heat source is built in, and a pressure roller 32 forming a fixing nip portion N together with the fixing roller 31. In the fixing nip portion N, the fixing unit 30 heats and pressurizes the sheet to which the toner image has been transferred in the secondary transfer nip portion T, thereby implementing a fixing process to weld the toner to the sheet. The sheet that has undergone the fixing process is discharged from the sheet discharge port 12 toward the paper discharge tray 11.

A sheet conveyance path for conveying the sheet is provided inside the body housing 10. The sheet conveyance path includes a main conveyance path P1 extending in the vertical direction through the secondary transfer nip portion T and the fixing unit 30. The downstream end of the main conveyance path P1 is connected to the sheet discharge port 12. A reversing conveyance path P2, which reverses and conveys the sheet during a double-sided printing, extends from the downstream end of the main conveyance path P1 to near the upstream end. Further, a manual feed sheet conveyance path P3 extending from the manual feed tray 13 to the main conveyance path P1 is arranged above the paper feed cassette 14.

The paper feed cassette 14 is provided with a sheet housing portion that houses a bundle of sheets. Near the upper right of the paper feed cassette 14, there are provided a pickup roller 151 that takes out the sheet of the top layer of the bundle of sheets one by one, and a paper feed roller pair 152 that feeds the sheet to the upstream end of the main conveyance path P1. The sheet placed on the manual feed tray 13 is also fed through the manual feed sheet conveyance path P3 to the upstream end of the main conveyance path P1. On the upstream side of the secondary transfer nip portion T of the main conveyance path P1, there is disposed a resist roller pair 153 which feeds the sheet to the transfer nip portion at a specific timing.

When the sheet is subjected to the single-sided printing (image formation) process, the sheet is fed from the paper feed cassette 14 or the manual feed tray 13 to the main conveyance path P1, and the sheet is subjected to the toner image transfer process in the secondary transfer nip portion T and subjected to the fixing process in which the transferred toner is fixed to the sheet in the fixing unit 30. Thereafter, the sheet is discharged from the sheet discharge port 12 onto the paper discharge tray 11. On the other hand, when the double-sided printing process is performed on the sheet, after the transfer process and fixing process are performed on one side of the sheet, the sheet is partially discharged from the sheet discharge port 12 onto the paper discharge tray 11. Thereafter, the sheet is conveyed in a switchback manner, passes through the reversing conveyance path P2, and is returned to near the upstream end of the main conveyance path P1. After that, the other side of the sheet is subjected to the transfer process and the fixing process, and the sheet is discharged from the sheet discharge port 12 onto the paper discharge tray 11.

Optical Scanning Unit with Cleaning System

Figure 2:
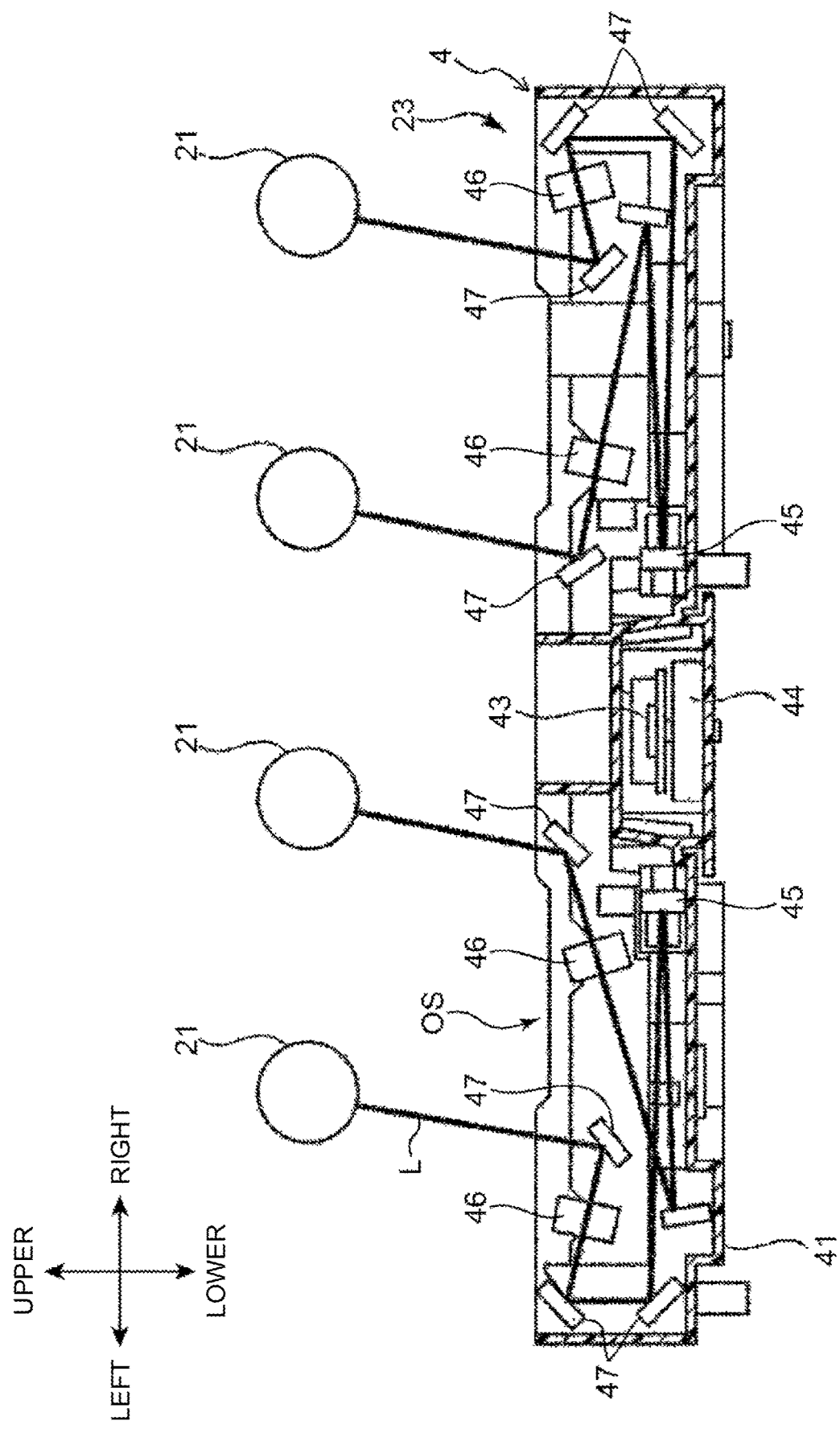
FIG. 2 is a schematic cross-sectional view illustrating an internal configuration of an optical scanning device.
Figure 3:
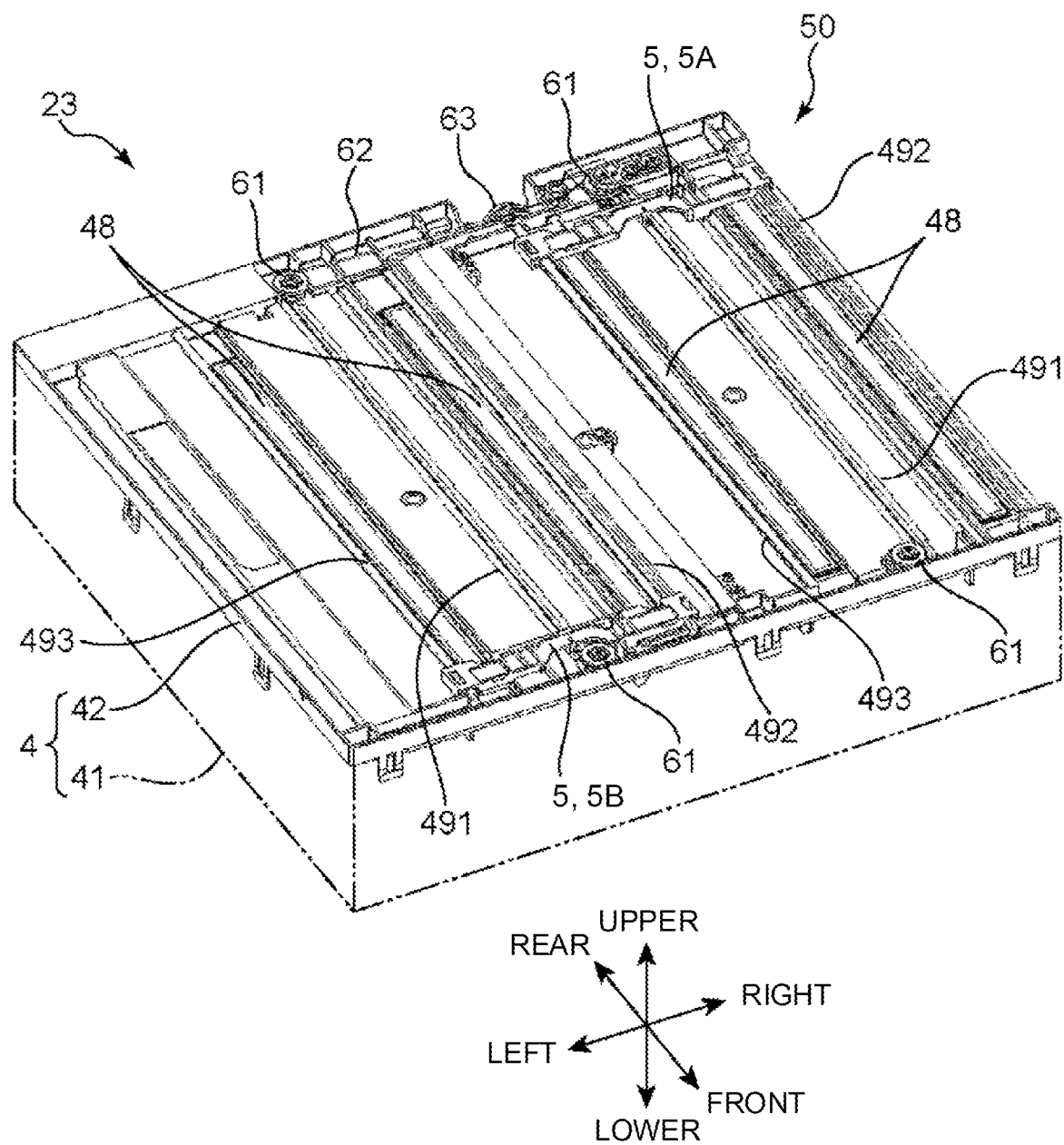
FIG. 3 is a perspective view of the optical scanning device.
Figure 4:
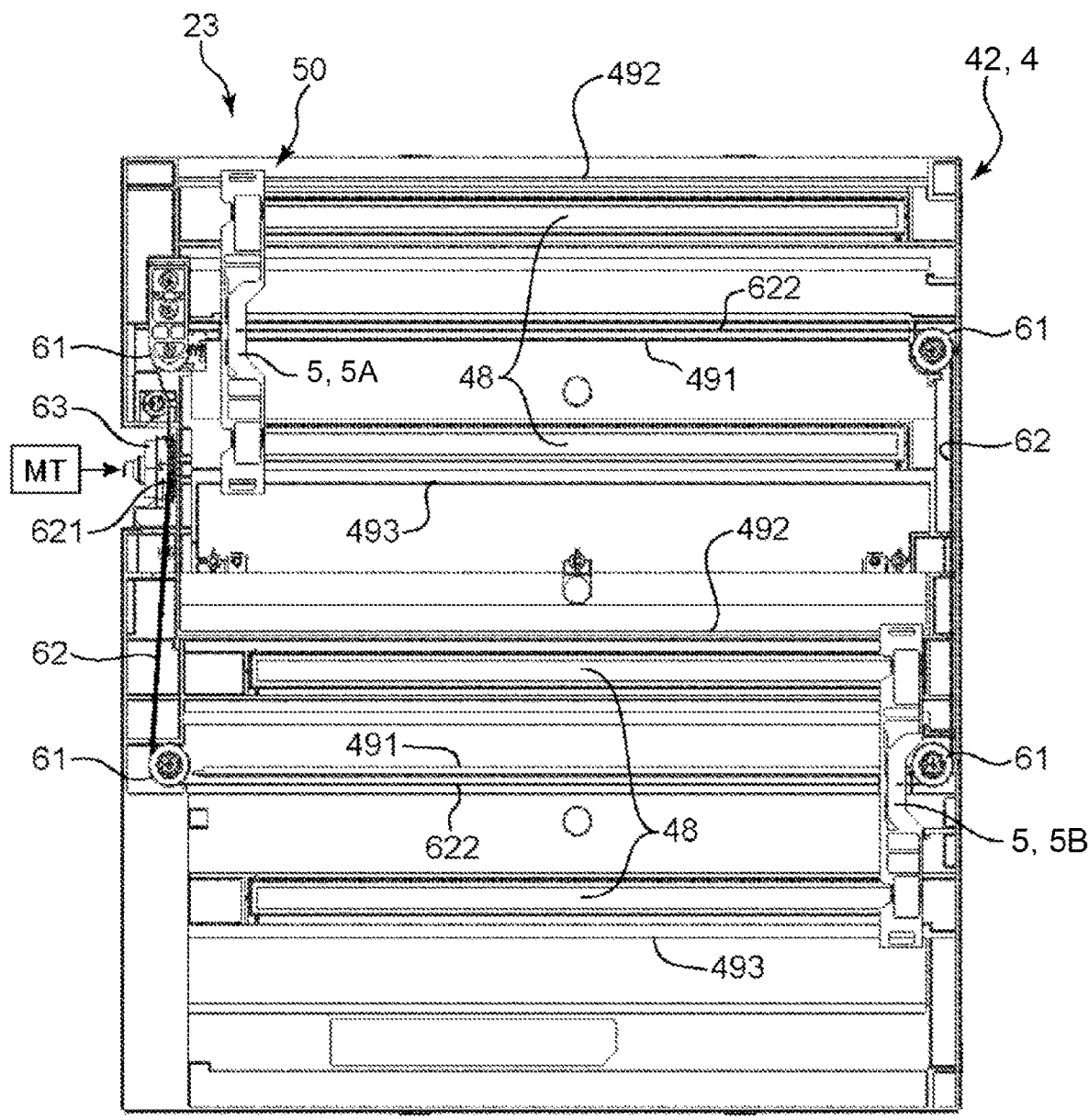
FIG. 4 is a top view of the optical scanning device.
Figure 4:
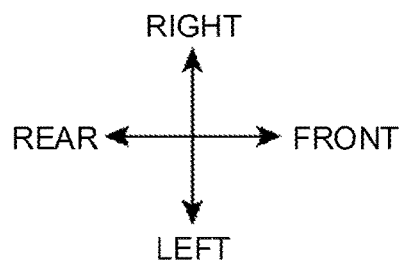

Then, the optical scanning unit 23 will now be described in detail. FIG. 2 is a schematic cross-sectional view illustrating an internal configuration of the optical scanning unit 23. FIG. 3 is a perspective view of the optical scanning unit 23, and FIG. 4 is a top view thereof, respectively. The directional indications of back and forth, left and right, and up and down in FIGS. 2 to 4 are for convenience of explanation and do not necessarily correspond to the actual directions.

The optical scanning unit 23 includes an optical system OS that generates a scanning light L (a light ray for optical scanning), a housing 4 that houses the optical system OS, and a cleaning system 50 that is assembled to the housing 4. The housing 4 includes a lower housing 41 including a rectangular container with an open upper surface and a lid 42 for sealing the opening. FIG. 2 illustrates the cross-sectional view in which the lid 42 is removed, and FIG. 3 briefly illustrates the lower housing 41 with dotted lines. The lid 42 has an emission opening for emitting the scanning light L generated by the optical system OS to the outside, and a dustproof glass 48 (window portion) is fitted in the emission opening. The cleaning system 50 is assembled to the lid 42 (housing 40) and cleans the dustproof glass 48.

Referring to FIG. 2, the optical system OS includes a light source (not shown), a polygon mirror 43, a polygon motor 44, a first scanning lens 45, a second scanning lens 46, and a plurality of mirrors 47. The light source includes a semiconductor laser for emitting the laser beam that becomes the scanning light L. The polygon mirror 43 is a polyhedral mirror with a deflection surface formed along each side of a regular hexagon. The polygon motor 44 rotates and drives the polygon mirror 43 around a rotation axis. The polygon mirror 43 deflects the scanning light L for each color emitted from the light source while rotating around the rotation axis and scans the peripheral surface of each photoconductor drum 21 with the scanning light L.

The first scanning lens 45 and the second scanning lens 46 are disposed between the polygon mirror 43 and the photoconductor drum 21 on the optical path of the scanning light L to image each scanning light L onto the peripheral surface of each photoconductor drum 21. The present embodiment illustrates the optical scanning unit 23 in which two sets of first and second scanning lenses 45, 46 are oppositely disposed across the polygon mirror 43. That is, a set of first and second scanning lenses 45, 46 is arranged for the two photoconductor drums 21 on the right (for example, for magenta and black), and another set of first and second scanning lenses 45, 46 is arranged for the two photoconductor drums 21 on the left (for example, for yellow and cyan). The first and second scanning lenses 45 and 46 are lenses having a distortion aberration (fθ characteristic) in which the angle of the incident light and the image height are in a proportional relation. Toward the respective photoconductor drums 21, the plurality of mirrors 47 reflects the scanning light L which is deflected by the polygon mirror 43.

Referring to FIGS. 3 and 4, four of the dustproof glasses 48 are mounted on the lid 42, corresponding to the four colored photoconductor drums 21. The four dustproof glasses 48 each have a rectangular shape that is long in the front-back direction and are arranged in parallel at a specific interval in the left-right direction. The two dustproof glasses 48 on the right side allow passage of the scanning lights L for magenta and black, for example, and the two dustproof glasses 48 on the left side allow passage of the scanning lights L for yellow and cyan, for example.

In the lid 42, a central groove 491 extending in the front-to-back direction is formed between the two dustproof glasses 48 on the right side and the left side, respectively. A right guide rail 492 extending in the front-to-back direction is provided on the right outer side of the two dustproof glasses 48, and a left guide rail 493 extending in the front-to-back direction is provided on the left outer side. The central groove 491, the right guide rail 492 and the left guide rail 493 extend generally over the entire length of the lid 42 from the front end to the rear end, and are also disposed parallel to the longitudinal direction of the dustproof glass 48.

A total of four driven rotating pulleys 61 are disposed on the front and rear end sides of the lid 42, at the front and rear end portions of the two central grooves 491. A drive wire 62 is stretched across the four pulleys 61. A drive gear 63 has a circumference around which the drive wire 62 is wound and is driven forward or reverse by a drive motor MT. The drive wire 62 has a wound portion 621 that is wound around the circumference of the drive gear 63 and an in-groove portion 622 that is housed in the central groove 491. When a drive power is applied to the drive gear 63 from the drive motor MT, the drive wire 62 moves along the circumferential path defined by the four pulleys 61.

Figure 5:
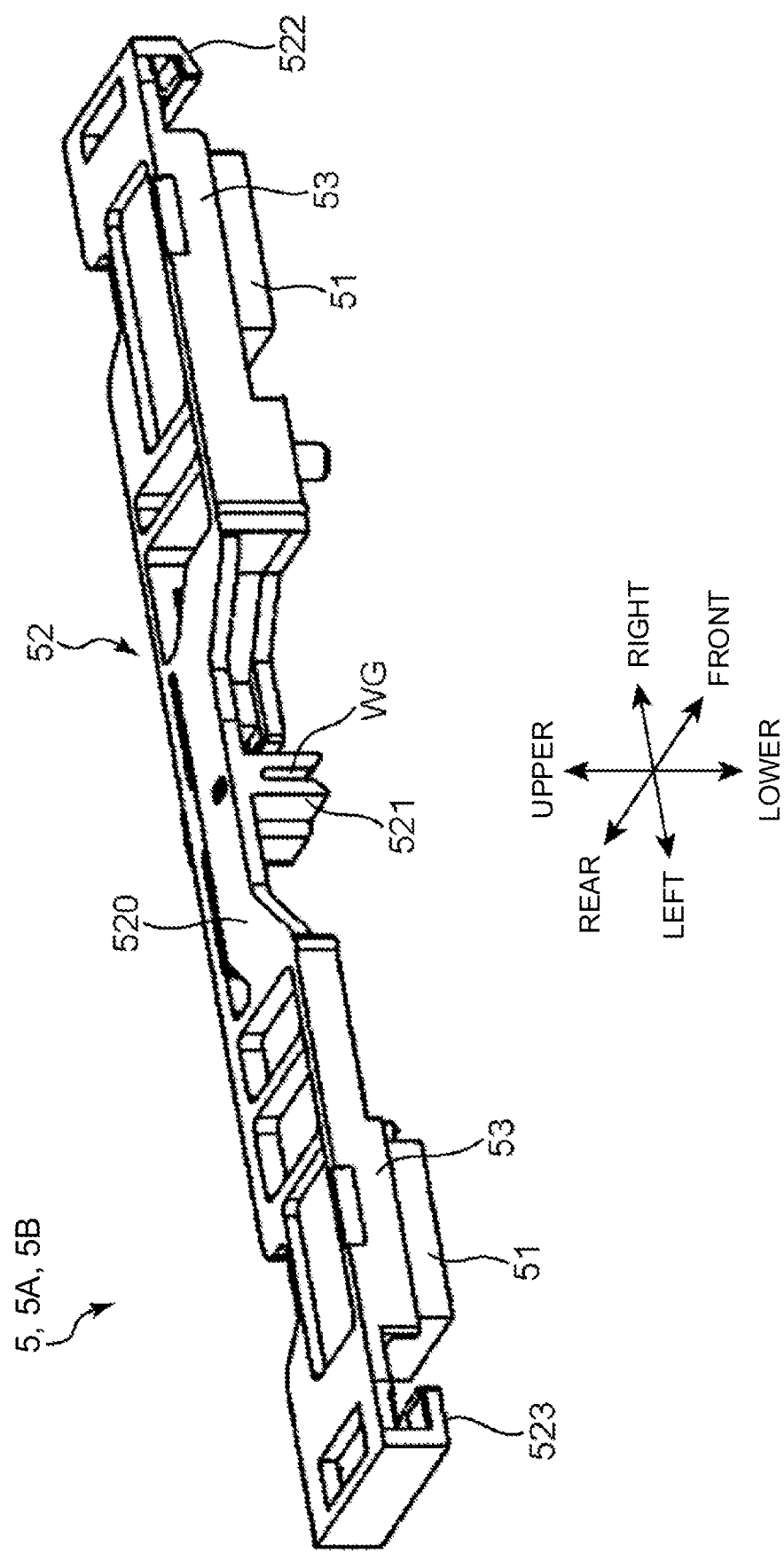
FIG. 5 is a perspective view of a cleaning unit.

The cleaning system 50 includes two cleaning units 5 (a first cleaning unit 5A and a second cleaning unit 5B). In the present embodiment, the first cleaning unit 5A is arranged for cleaning the two dustproof glasses 48 on the right side, and the second cleaning unit 5B is arranged for cleaning the two dustproof glasses 48 on the left side. FIG. 5 is a perspective view of the cleaning unit 5 (5A, 5B). The cleaning unit 5 includes a cleaning member 51 that slidably contacts the dustproof glass 48 and cleans the dustproof glass 48, and a holder 52 that holds the cleaning member 51.

The holder 52 includes a holder body 520, a coupling boss portion 521, a right guide portion 522, a left guide portion 523, and a holding recess portion 53. The holder body 520 is a frame member that is long in the left-right direction. The left-right width of the holder body 520 is longer than the left-right aligned width of the two dustproof glasses 48. The coupling boss portion 521 is provided to protrude at the lower portion of the holder body 520 in the center in the left-right direction. The coupling boss portion 521 has a wire groove WG into which the drive wire 62 is tightly fitted. In this wire groove WG, the holder 52 is fixed to the drive wire 62, and the drive wire 62, when moving, also moves the holder 52. The right guide portion 522 is a hook-shaped engagement portion provided on the right end side of the holder body 520. The left guide portion 523 is a hook-shaped engagement portion provided on the left end side of the holder body 520.

The coupling boss portion 521 is play-fitted into the central groove 491 of the lid 42. The right guide portion 522 is engaged with the right guide rail 492 and the left guide portion 523 is engaged with the left guide rail 493 in a manner to be respectively fitted thereto from the outside. Accordingly, the holder 52 can move in a forward or backward direction, while being guided by the right and left guide rails 492 and 493, and with the coupling boss portion 521 being guided by the central groove 491.

The holding recess portions 53 are portions that hold the cleaning members 51 and are respectively disposed on the right side and the left side of the holder body 520. The cleaning member 51 is retained in the holding recess portion 53 in such a manner that the upper end region of the cleaning member 51 is fitted into the holding recess portion 53. For example, a double-sided tape or an adhesive is interposed between the upper surface of the cleaning member 51 and the holding recess portion 53, and the two are joined together. The position of arranging the holding recess portion 53 corresponds to the dustproof glass 48. That is, with the holder 52 fitted to the right and left guide rails 492 and 493, the holding recess portions 53 are disposed at a position facing the dustproof glass 48 on the right side and at a position facing the dustproof glass 48 on the left side, respectively. The lower surface of the cleaning member 51 held by the holding recess portion 53 is caused to contact the surface of the dustproof glass 48 with a specific pressing force.

For example, assume that when the drive gear 63 is driven in the forward rotation by the drive motor MT, the drive wire 62 shown in FIG. 4 moves clockwise around the circumference. In the case of the above positive rotation drive, the first cleaning unit 5A on the right side, which is fixed to the drive wire 62, moves from rear to front while being guided by the right and left guide rails 492 and 493. On the other hand, the second cleaning unit 5B on the left side is similarly guided and moves from front to rear. In contrast, when the drive gear 63 is driven in the reverse rotation, the first cleaning unit 5A moves from front to rear and the second cleaning unit 5B moves from rear to front.

During the movement of the first and second cleaning units 5A, 5B (holders 52), the lower surface of the cleaning member 51 slides back and forth (in a specific movement direction) on the surface of the dustproof glass 48. This cleans the dustproof glass 48. For example, it is assumed that the period during which the drive gear 63 is driven in the forward rotation is an outward cleaning period and the period during which the drive gear 63 is driven in the reverse rotation is a return cleaning period. The state of FIG. 4 is defined as the state before the start of the outward cleaning period. In the outward cleaning period, the first cleaning unit 5A is moved from near the rear end to near the front end of the central groove 491, while the second cleaning unit 5B is moved from near the front end to near the rear end. During this movement, the cleaning members 51 of the first and second cleaning units 5A and 5B perform the outward cleaning of the dustproof glasses 48. In contrast, in the return cleaning period, the first cleaning unit 5A is moved from near the front end to near the rear end of the central groove 491, while the second cleaning unit 5B is moved from near the rear end to near the front end of the central groove 491. During this movement, the cleaning members 51 of the first and second cleaning units 5A and 5B clean perform the return cleaning of the dustproof glass 48.

Cleaning Member of Comparative Example

Figure 6A:
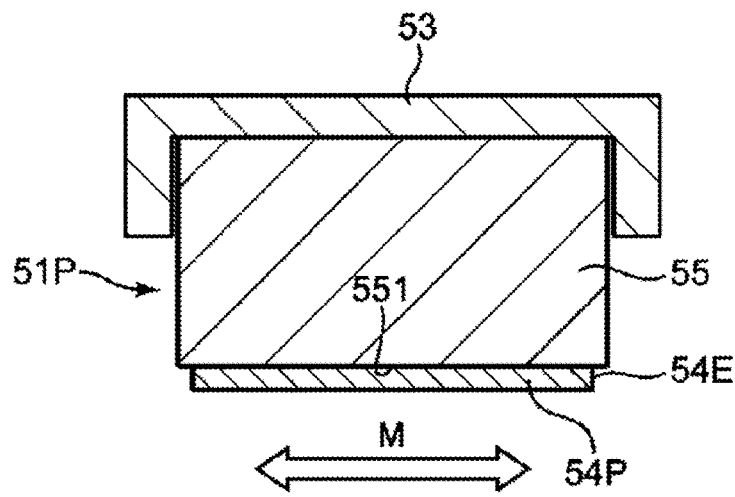
FIG. 6A is a cross-sectional view of a cleaning member of a comparative example.

FIG. 6A is a cross-sectional view of a cleaning member 51P of a comparative example. Here, only the holding recess portion 53 is schematically shown for the holder 52 (the same is shown in the following figures). The cleaning member 51P includes a cleaner member 54P that contacts the surface of the dustproof glass 48 and a pressing member 55 that is formed of an elastic body. The pressing member 55 has a lower surface 551 that presses the cleaner member 54P toward the dustproof glass 48. The arrow in the figure indicates a movement direction M of the holder 52.

The cleaner member 54P is adhered to the lower surface 551 of the pressing member 55 by using a double-sided tape, an adhesive, or the like. In the movement direction M, the width of the cleaner member 54P is set to be slightly shorter than the width of the lower surface 551. For this reason, both end portions of the lower surface 551 in the movement direction M are slightly exposed. The cleaning member 51P moves in the movement direction M while being held in the holding recess portion 53, and the cleaner member 54P slidably contacts the dustproof glass 48 during the movement and cleans the dustproof glass 48 in a manner to wipe off any dirt on the surface of the dustproof glass 48.

Figure 6B:
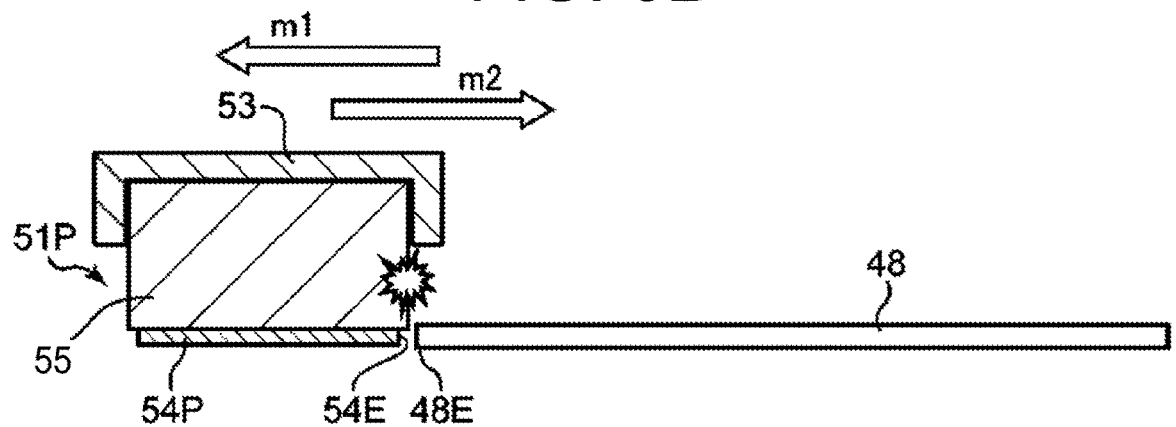
FIGS. 6B and 6C are each a schematic view illustrating a problem of the cleaning member of the comparative example.

However, with the cleaning member 51P of the comparative example, peeling or rolling of the cleaner member 54P may occur. FIG. 6B is a schematic view illustrating a problem of the cleaning member 51P of the comparative example. As described above, the cleaning member 51P performs an outward cleaning m1 and a return cleaning m2 in which the cleaning member 51P moves reciprocally on the dustproof glass 48. In the outward cleaning m1, the cleaning member 51P is moved until exceeding a glass edge portion 48E of the dustproof glass 48. In the state where the outward cleaning m1 is completed, the cleaning member 51P is in a position away from on the dustproof glass 48. In the subsequent return cleaning m2, the cleaning member 51P is moved in a direction opposite to that of the outward cleaning m1. At the initial movement thereof, the cleaning member 51P rides up again from the glass edge portion 48E onto the dustproof glass 48. In this case, a side end edge 54E of the cleaner member 54P collides with the glass edge portion 48E because a step is created in the portion where the glass edge portion 48E is present. This collision may cause the cleaner member 54P to detach from the lower surface 551 of the pressing member 55.

Figure 6C:
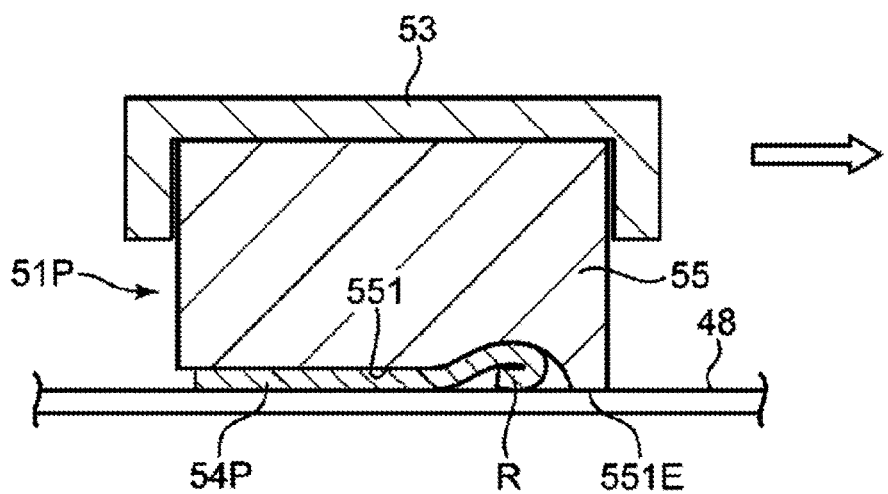

FIG. 6C is a schematic view illustrating another problem with the cleaning member 51P of the comparative example. Here, the problem of catching due to contact between the pressing member 55 and the dustproof glass 48 is shown. In general, the friction coefficient of the dustproof glass 48 in the initial stage of use is high, and the friction coefficient is not constant in the movement direction M. Therefore, when the cleaning member 51P moves in the movement direction M while contacting the dustproof glass 48, if the cleaning member 51P encounters a point having a high friction coefficient, a case may arise in which the cleaning member 51P cannot follow the movement of the holding recess portion 53 (holder 52). In this case, the cleaning member 51P is brought into a state of leaning forward, and a movement direction tip end portion 551E of the lower surface 551 of the pressing member 55 may directly contact the dustproof glass 48. The pressing member 55 formed of an elastic body generally has a high friction coefficient. Then, the frictional resistance of the cleaning member 51P against the dustproof glass 48 rises at once, and a movement direction tip end portion of the cleaner member 54P may be rolled up and curled to generate a rolled portion R.

Various Embodiments of Cleaning Members

The following illustrates various embodiments of the cleaning members that do not cause the problem of peeling or rolling of the cleaner member as in the above comparative example.

First Embodiment

Figure 7A:
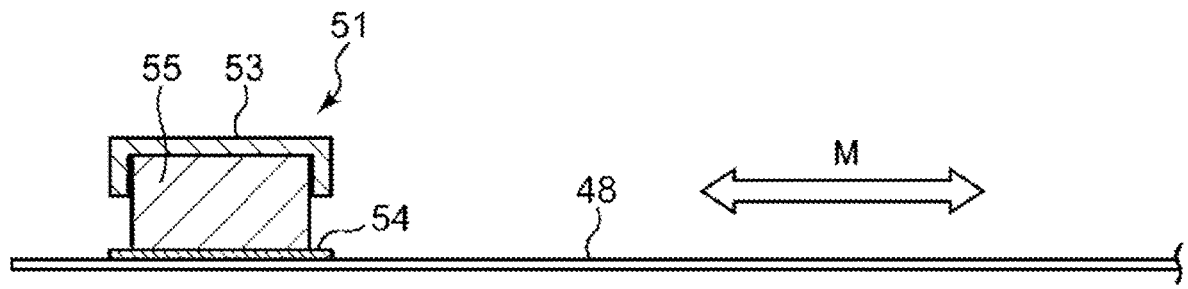
FIG. 7A is a cross-sectional view of a cleaning member according to a first embodiment of the present disclosure.
Figure 7B:
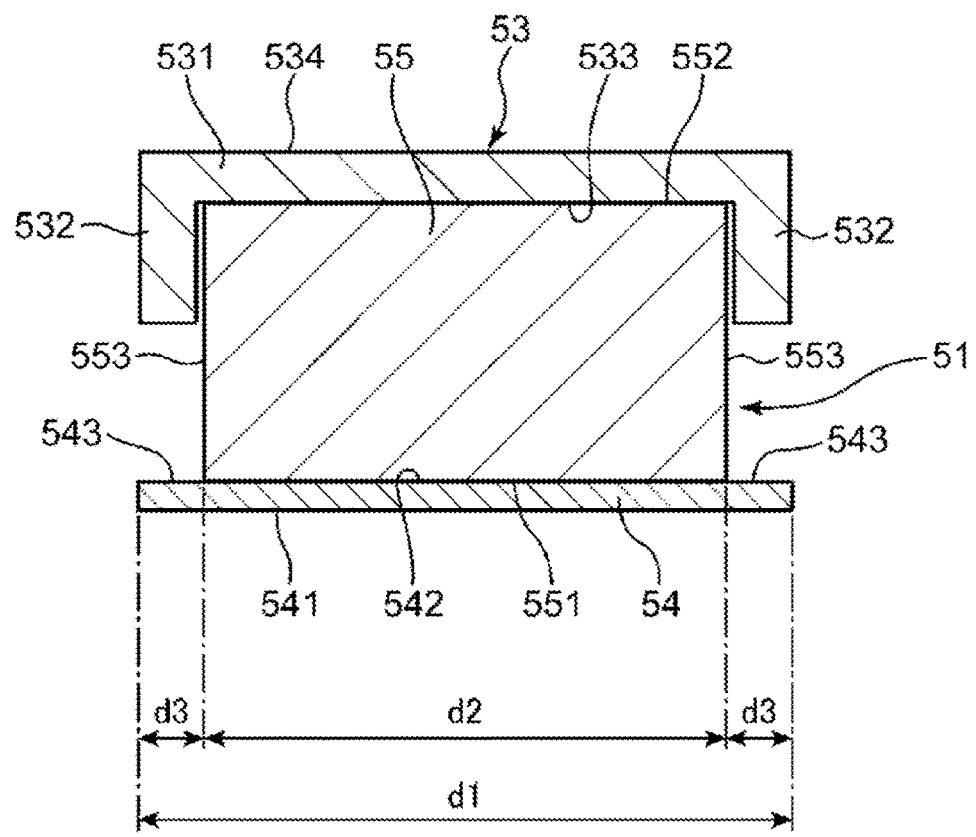
FIG. 7B is an enlarged view of the cleaning member.

FIG. 7A is a cross-sectional view of the cleaning member 51 according to a first embodiment of the present disclosure, and FIG. 7B is an enlarged view of the cleaning member 51. The cleaning member 51 includes a cleaner member 54 that contacts the surface of the dustproof glass 48 and the pressing member 55 that is formed of an elastic body. As in the comparative example described above, the cleaning member 51 moves reciprocally in the movement direction M while being held in the holding recess portion 53. During the movement of the cleaning member 51, the cleaner member 54 slidably contacts the dustproof glass 48 and cleans the surface of the dustproof glass 48 in a manner to wipe off any dirt on the surface.

As the cleaner member 54, for example, a sheet piece made of felt, non-woven fabric, or the like can be used. As the pressing member 55, for example, a rubber or rubber sponge such as urethane rubber, or a resin block piece having the required elasticity can be used.

The pressing member 55 has a rectangular shape and includes the lower surface 551 (a pressing surface), an upper surface 552 which is a surface opposite to the lower surface 551, and a pair of side surfaces 553 (a pair of side surfaces) extending between the lower surface 551 and the upper surface 552. The lower surface 551 is a pressing surface that presses the cleaner member 54 toward the dustproof glass 48. The cleaner member 54 is adhered to the lower surface 551 by using, for example, a double-sided tape or an adhesive. The upper surface 552 is a surface that is mounted to the holding recess portion 53. For example, the upper surface 552 is adhered to the holding recess portion 53 by using adhesive means such as double-sided tape or adhesive, or mechanical engagement means.

The pair of side surfaces 553 are surfaces that rise from both end edges of the lower surface 551 in the movement direction M and reach both end edges of the upper surface 552. The pair of side surfaces 553 are surfaces that are not subject to any special constraints. This is because if any member is joined to the pair of side surfaces 553, the joining will change the elastic characteristic of the pressing member 55. There are also a pair of side surfaces in the vertical direction of the paper in FIG. 7, but these side surfaces are also considered to be unconstrained in any way.

The cleaner member 54 includes a cleaning surface 541 which is the lower surface of the sheet piece, and a joining surface 542 which is the upper surface of the sheet piece. The cleaning surface 541 is a surface that is in contact with the surface of the dustproof glass 48. The joining surface 542 is a surface that is adhered to the lower surface 551 of the pressing member 55. The cleaner member 54 is given a pressing force from the holder 52 via the pressing member 55. The pressing force of the holder 52 is generated from its engagement with the right and left guide rails 492 and 493. By the intervention of the pressing member 55, the pressing force is even and the entire surface of the cleaning surface 541 can contact the surface of the dustproof glass 48 with an equal pressure. Accordingly, the dustproof glass 48 can be cleaned well without causing the cleaner member 54 to make an uneven contact or the like.

The holding recess portion 53 is partitioned by a horizontal wall 531 extending in a horizontal direction and a hanging wall 532 hanging downwardly from an end edge of the horizontal wall 531. The holding recess portion 53 is a cavity that can house a region near the upper end of the cleaning member 51. The horizontal wall 531 includes a lower surface 533 and an upper surface 534. The upper surface 552 of the pressing member 55 is joined to the lower surface 533.

The cleaning member 51 of the first embodiment differs from the above comparative example in the width of the movement direction M of the cleaner member 54. In the movement direction M, a width d1 of the cleaner member 54 is set to be wider (d1>d2) than a width d2 of the lower surface 551 of the pressing member 55. That is, in the movement direction M, the width of the sheet piece constituting the cleaner member 54 is wider than the side length of the pressing member 55 formed of a cuboid. It is desirable to set d1 to about 1.05 to 1.50 times d2. As a result of the relation of d1>d2, the cleaner member 54 is provided with extended portions 543 that protrude respectively from a pair of side surfaces 553 of the pressing member 55 in the movement direction M. A protruding length d3 of each extended portion 543 is (d1−d2)×(½).

Since being a portion not receiving the elastic pressing force from the pressing member 55, the extended portion 543 does not contribute much to cleaning of the dustproof glass 48. However, by including the extended portion 543, the cleaner member 54 can make it unlikely to cause interference with the glass edge portion 48E of the dustproof glass 48 (see FIG. 6B). For example, when the outward cleaning m1 is completed, the movement of the holder 52 is restricted in a manner that at least a part of the extended portion 543 is in a state of riding up on the glass edge portion 48E. In this way, occurrence of the interference between the tip end edge of the cleaner member 54 in the movement direction M and the glass edge portion 48E can be avoided at the time of the initial movement of the return cleaning M2.

In addition, the problem of catching due to contact between the pressing member 55 and the dustproof glass 48, which is caused by the high friction coefficient of the dustproof glass 48 or by the fact that the friction coefficient is not constant in the movement direction M, can also be avoided by the presence of the extended portion 543. That is, even if a case occurs in which the cleaning member 51 cannot follow the movement of the holding recess portion 53 (holder 52) due to the frictional force, the extended portion 543 extending on the forward side of the movement direction M guards the contact of the pressing member 55 with the dustproof glass 48. Accordingly, the pressing member 55 does not directly contact the dustproof glass 48, and peeling or rolling of the cleaner member 54 from the pressing member 55 can be prevented.

Second Embodiment

Figure 8:
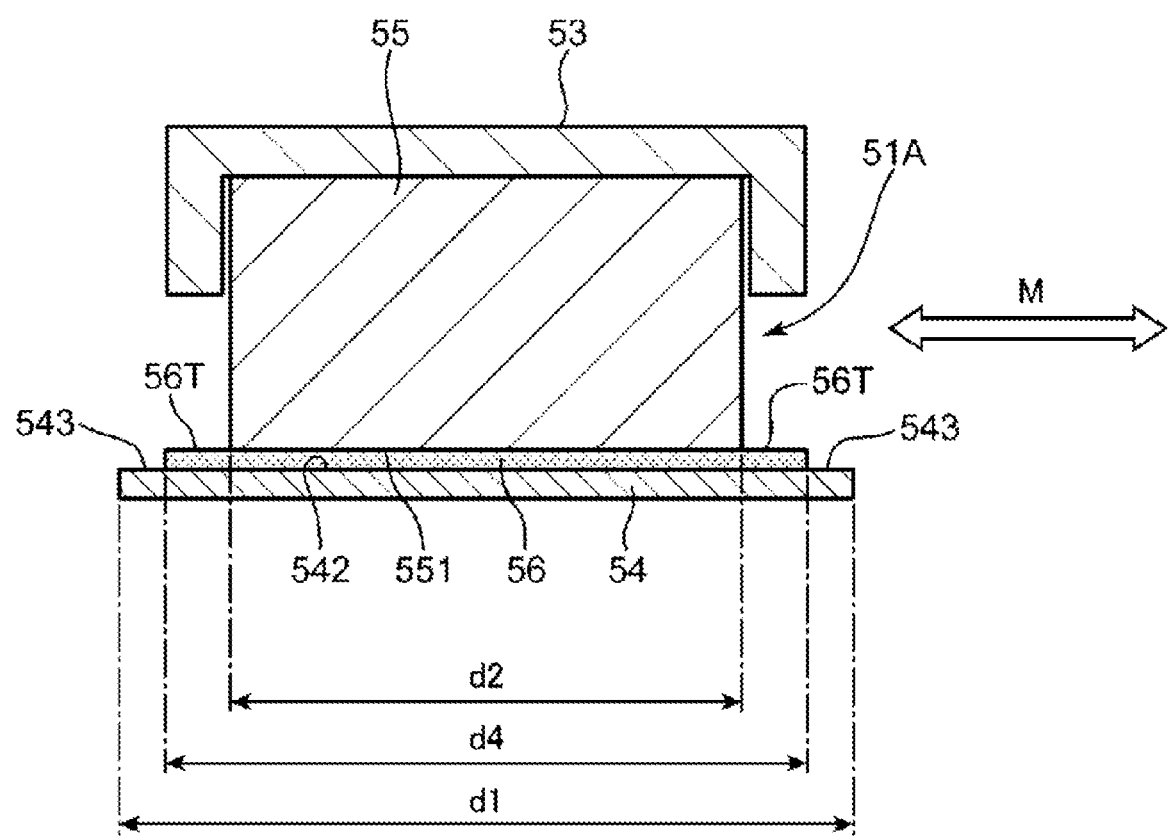
FIG. 8 is a cross-sectional view of a cleaning member of a second embodiment.

FIG. 8 is a cross-sectional view of the cleaning member 51A of a second embodiment. The cleaning member 51A differs from the cleaning member 51 of the first embodiment in that the former has a double-sided tape 56 that is wider than the lower surface 551 of the pressing member 55. Since the other configuration of the cleaning member 51A is the same as that of the first embodiment, a detailed description will be omitted.

The double-sided tape 56 is a member having adhesive layers on both surfaces of a sheet-like base material. The double-sided tape 56 is disposed between the joining surface 542 of the cleaner member 54 and the lower surface 551 of the pressing member 55, and joins the cleaner member 54 with the pressing member 55. A width d4 of the double-sided tape 56 in the movement direction M is wider than the width d2 of the lower surface 551, while the width d4 is narrower than the width d1 of the cleaner member 54 (d1>d4>d2).

As a result of the relation of d4>d2, the double-sided tape 56 includes protruding portions which protrude respectively from the pair of side surfaces 553 of the pressing member 55 in the movement direction M. This protruding portion is a trap portion 56T for toner, dust, and the like. Since d1>d4, the extended portion 543 of the cleaner member 54 protrudes from the pair of side surfaces 553 further than the trap portion 56T. The protruding length of the extended portion 543 may be set to be substantially the same as the protruding length of the trap portion 56T (d1=d4).

With the cleaning member 51A of the second embodiment, the cleaner member 54 can be easily mounted to the lower surface 551 of the pressing member 55 by using the double-sided tape 56. In addition, the trap portion 56T can capture the toner or dust that deposits on the extended portion 543. That is, when the cleaner member 54 is provided with the extended portion 543, the toner used in the image forming units 2Y-2Bk and the surrounding dust may deposit on the upper surface of the extended portion 543 since the pressing member 55 is not present on the upper surface of the extended portion 543. The deposit falling on the dustproof glass 48 due to vibration or the like will block the scanning light L and cause an image defect. However, in the present embodiment, the trap portion 56T is superimposed on the extended portion 543. Although the lower surface of the trap portion 56T is adhered to the extended portion 543 of the cleaner member 54, the upper surface of the trap portion 56T has the adhesive layer exposed. Accordingly, even in a situation where the toner and dust are deposited on the extended portion 543, the deposit deposits on the adhesive layer of the trap portion 56T. Therefore, the fall and scattering of the deposit can be prevented.

Third Embodiment

Figure 9:
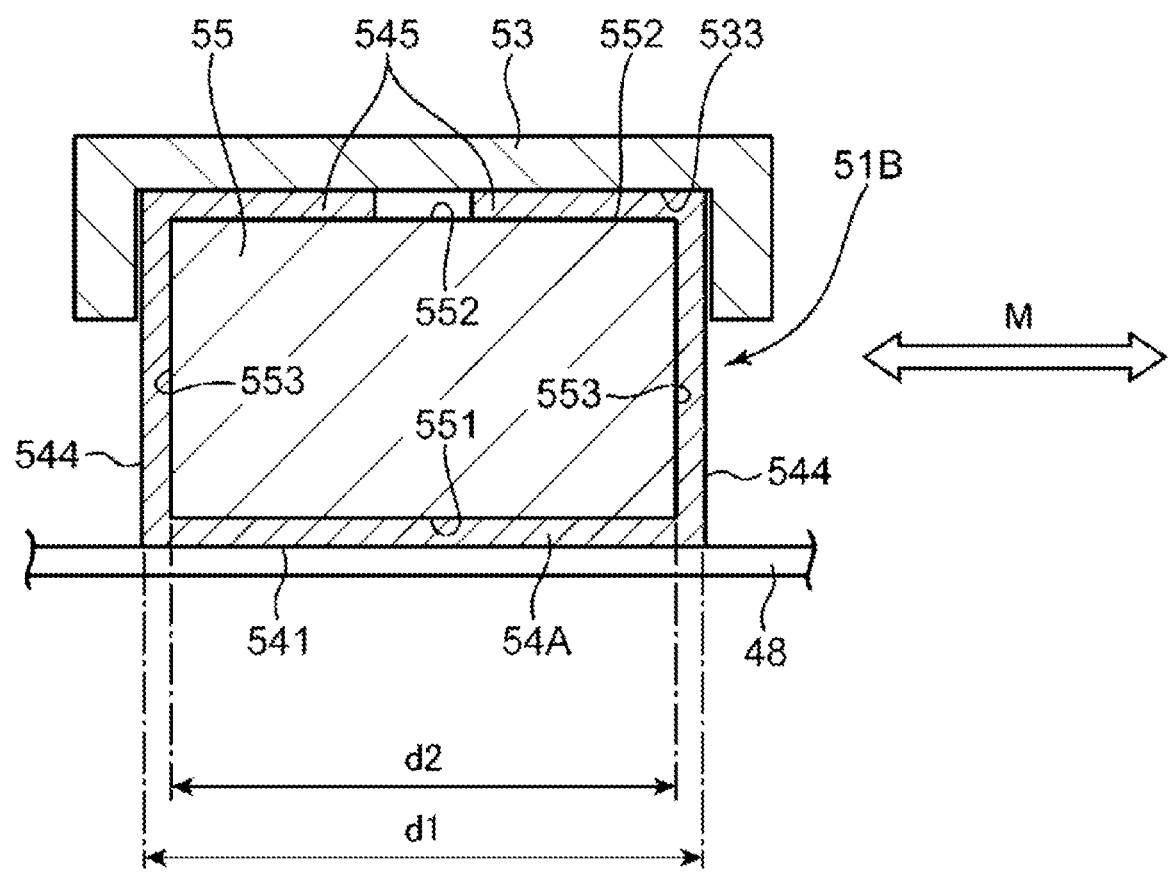
FIG. 9 is a cross-sectional view of a cleaning member of a third embodiment.

FIG. 9 is a cross-sectional view of a cleaning member 51B of the third embodiment. The third embodiment illustrates the cleaning member 51B provided with a cleaner member 54A in a manner that the cleaner member 54A wraps the pressing member 55. The cleaner member 54A is mounted to the pressing member 55 in a manner to wrap the lower surface 551 and the pair of side surfaces 553 of the pressing member 55. That is, the cleaner member 54A is provided with a pair of side surface wrapping portions 544 and a pair of upper surface wrapping portions 545, in addition to a cleaning portion provided with the cleaning surface 541.

The cleaning portion provided with the cleaning surface 541 covers the lower surface 551 of the pressing member 55. It is the same as in the first and second embodiments described above in that the cleaning surface 541 is given an elastic pressing force by the pressing member 55 to thereby clean the dustproof glass 48. The pair of side surface wrapping portions 544 are portions that bend upwardly from both end edges of the cleaning surface 541 in the movement direction M. The pair of side surface wrapping portions 544 covers all of the pair of side surfaces 553 rising from both end edges of the lower surface 551 in the movement direction M. The pair of upper surface wrapping portions 545 bend inwardly from the upper ends of the side surface wrapping portions 544 and cover most of the upper surface 552. In other words, the present embodiment is an aspect in which the width d1 of the cleaner member 54A in the movement direction M is wider than the width d2 of the lower surface 551 (pressing surface) by wrapping the pressing member 55 with the cleaner member 54A.

Near the upper end of the cleaning member 51B, that is, the upper surface 552 of the pressing member 55 wrapped with the cleaner member 54A, is fitted into the holding recess portion 53. With this, the upper surface wrapping portion 545 is in a state of being sandwiched between the lower surface 533 of the holding recess portion 53 and the upper surface 552 of the pressing member 55. Appropriate adhesive means is provided at an appropriate place so that the state of the pressing member 55 wrapped with the cleaner member 54A is maintained. However, in order not to change the elasticity characteristic of the pressing member 55, the side surface wrapping portion 544 and the side surface 553 are in a state of non-adhesion.

With the cleaning member 51B of the third embodiment, the aspect in which the cleaner member 54A wraps the lower surface 551, the pair of side surfaces 553, and the upper surface 552 of the pressing member 55 is taken as the aspect in which the width d1 of the cleaner member 54A in the movement direction M is wider than the width d2 of the lower surface 551. Due to this wrapping, the joining interface between the lower surface 551 and the cleaner member 54A is not exposed. Therefore, even if the cleaning member 51B collides with the glass edge portion 48E of the dustproof glass 48, the cleaning member 51B will not be peeled off from the lower surface 551. Since the pressing member 55 is wrapped with the cleaner member 54A, the pressing member 55 does not come into direct contact with the dustproof glass 48. Accordingly, the peeling or rolling of the cleaner member 54A from the lower surface 551 can be reliably prevented.

Fourth Embodiment

Figure 10:
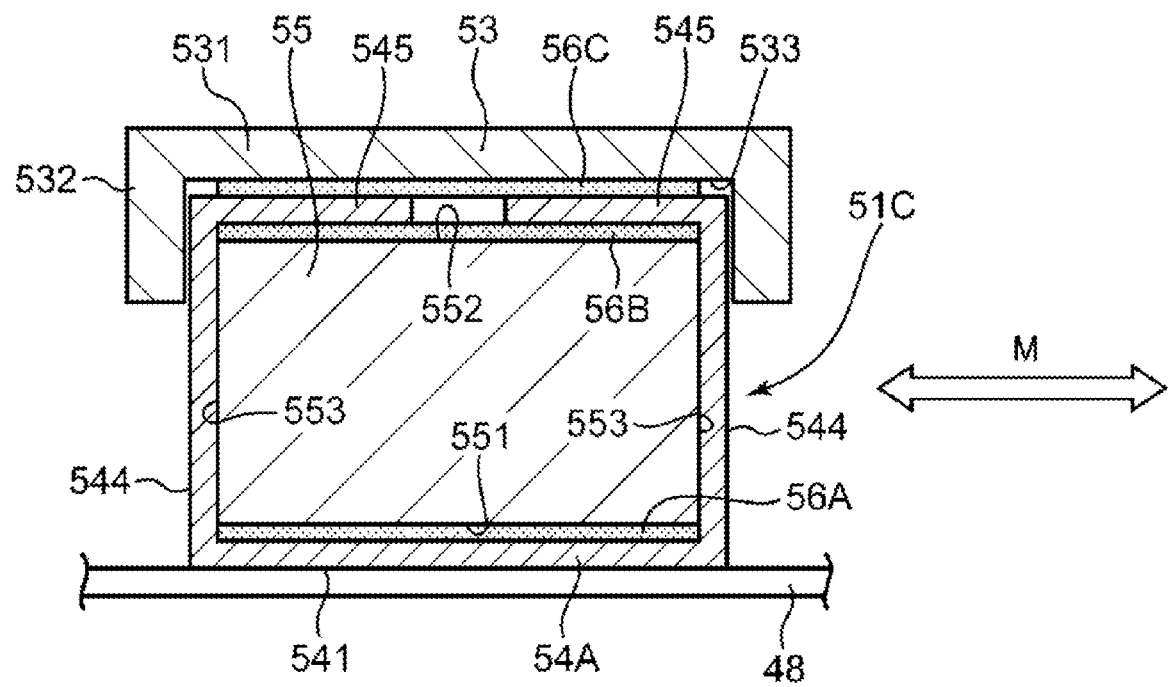
FIG. 10 is a cross-sectional view of a cleaning member of a fourth embodiment.

FIG. 10 is a cross-sectional view of a cleaning member 51C of a fourth embodiment. The cleaning member 51C differs from the fourth embodiment in that first, second, and third double-sided tapes 56A, 56B, and 56C are used as the above adhesive means.

The first double-sided tape 56A is disposed between the lower surface 551 of the pressing member 55 and the portion of the cleaning surface 541 of the cleaner member 54A. The second double-sided tape 56B is disposed between the upper surface 552 of the pressing member 55 and the upper surface wrapping portion 545 of the cleaner member 54A. The third double-sided tape 56C is disposed between the lower surface 533 of the horizontal wall 531 in the holding recess portion 53 and the upper surface wrapping portion 545. On the other hand, the pair of side surfaces 553 of the pressing member 55 and the side surface wrapping portion 544 of the cleaner member 54A are directly facing each other without a double-sided tape and are in a non-adhesive state.

With the cleaning member 51C of the fourth embodiment, the first and second double-sided tapes 56A and 56B allow the cleaner member 54A to be tightly integrated with the pressing member 55 in a state where the cleaner member 54A wraps the pressing member 55. The assembly of the cleaner member 54A with the pressing member 55 can be mounted to the holding recess portion 53 with a one-touch operation by using the third double-sided tape 56C. Accordingly, the assembly work of the cleaning unit 5 can be made more efficient. Since no double-sided tape is attached to the pair of side surfaces 553, no substantial change is caused to the elastic characteristic of the pressing member 55. Accordingly, to the cleaning surface 541 of the cleaner member 54A, the pressing member 55 can apply a pressure force as set. At least one of the first, second, and third double-sided tapes 56A, 56B, and 56C may be placed in a specific location, and one or two others may be omitted.

Fifth Embodiment

Figure 11:
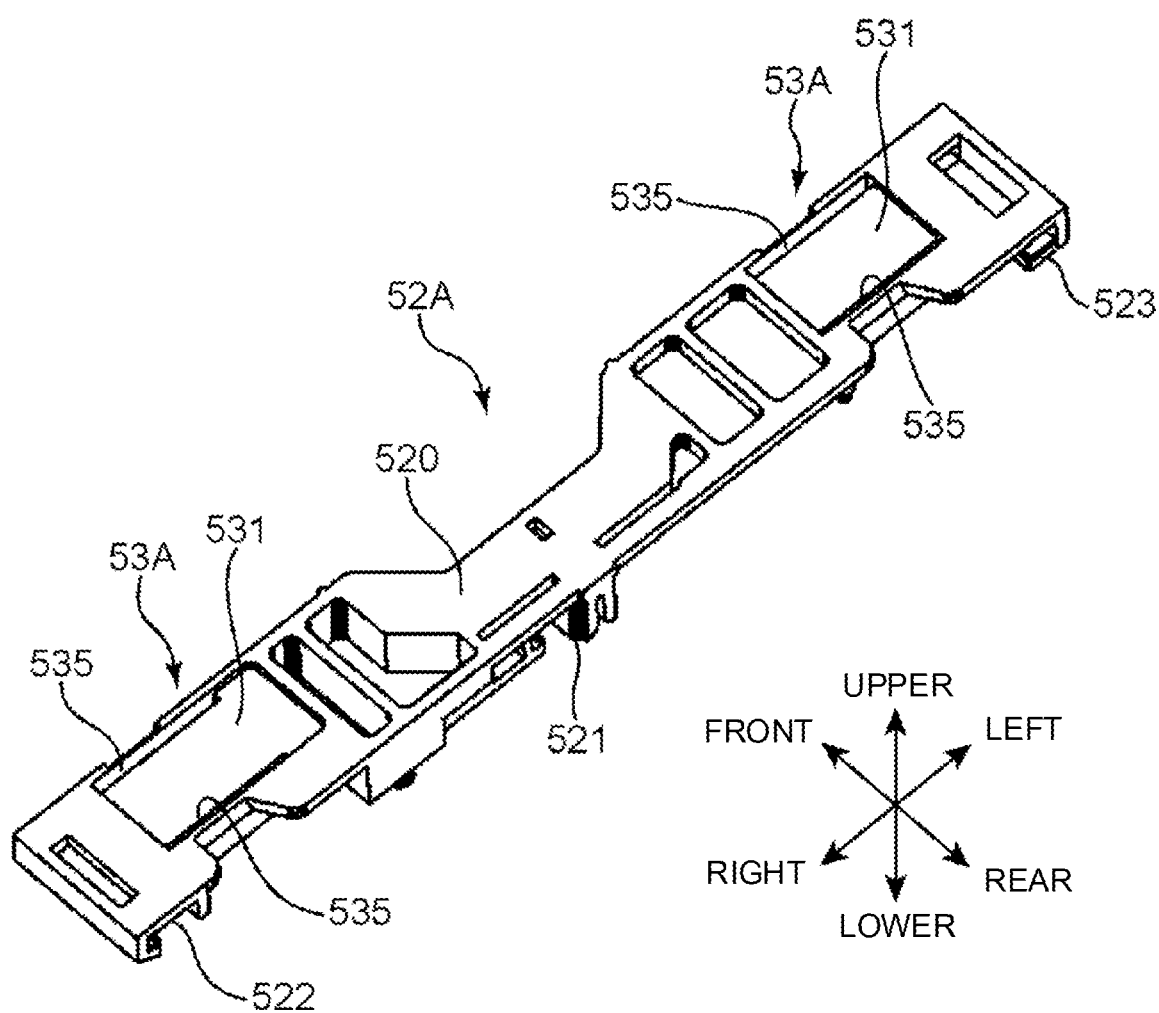
FIG. 11 is a perspective view of a holder to which a cleaning member according to a fifth embodiment is mounted.
Figure 12:
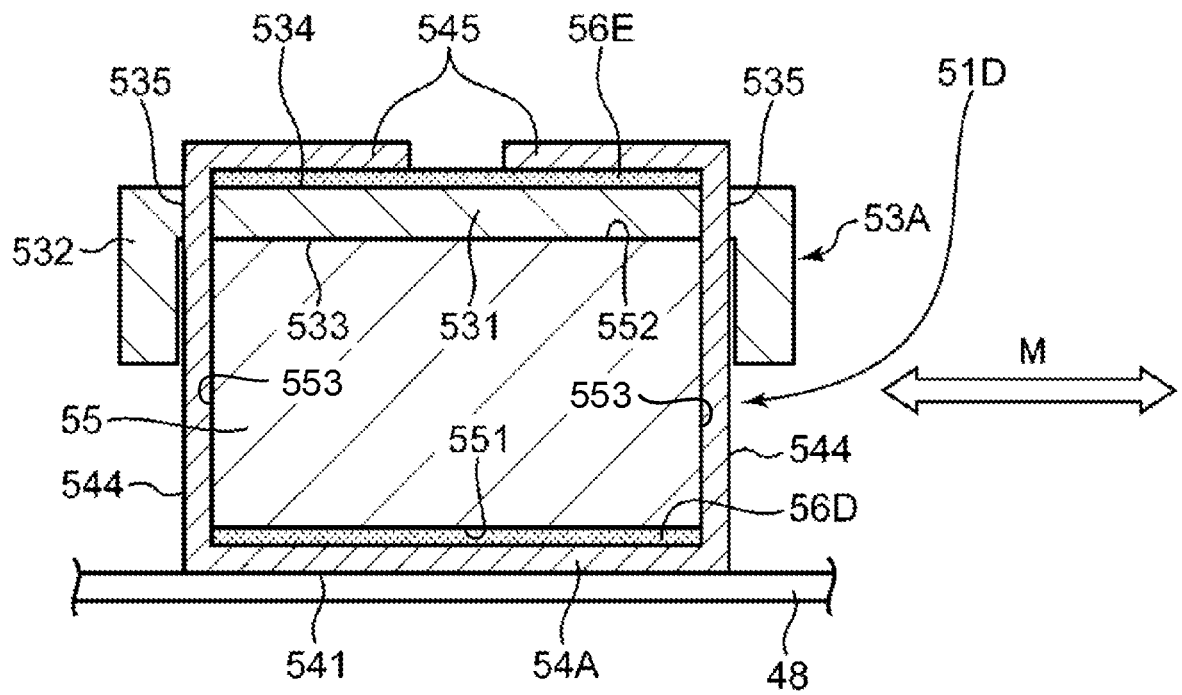
FIG. 12 is a cross-sectional view of the cleaning member according to the fifth embodiment.

FIG. 11 is a perspective view of a holder 52A used in a fifth embodiment, and FIG. 12 is a cross-sectional view of a cleaning member 51D of the fifth embodiment mounted to the holder 52A. The holder 52A of the fifth embodiment differs from the holder 52 of FIG. 5 in that a pair of slits 535 are formed in the holding recess portion 53A. Each slit 535 vertically penetrates the horizontal wall 531 that partitions the holding recess portion 53A. One slit 535 is located near the front end of the horizontal wall 531, and the other slit 535 is located near the rear end of the horizontal wall 531. The width in the left-right direction of the slit 535 is slightly greater than the width in the left-right direction of the cleaner member 54A used in the cleaning member 51D.

The cleaner member 54A is mounted to the pressing member 55 and the holder 52A in a manner to wrap the lower surface 551 and the pair of side surfaces 553 of the pressing member 55 and to wrap the upper surface 534 of the holding recess portion 53A through the slit 535. That is, the cleaner member 54A is provided with a pair of side surface wrapping portions 544 and a pair of upper surface wrapping portions 545 in addition to the cleaning portion provided with the cleaning surface 541, as in the third and fourth embodiments. The side surface wrapping portion 544 covers the side surface 553 of the pressing member 55. The upper end of the side surface wrapping portion 544 penetrates the slit 535 and reaches beyond the upper surface 534 of the horizontal wall 531. The upper surface wrapping portion 545 faces the upper surface 534 of the holding recess portion 53A.

Fourth and fifth double-sided tapes 56D and 56E are used to join the cleaner member 54A, the pressing member 55, and the holding recess portion 53A. The fourth double-sided tape 56D is disposed between the lower surface 551 of the pressing member 55 and the portion corresponding to the cleaning surface 541 of the cleaner member 54A, and adheres both members together. The fifth double-sided tape 56E is disposed between the upper surface wrapping portion 545 and the upper surface 534 of the holding recess portion 53A, and adheres both members together. In assembling, the lower surface 551 of the pressing member 55 and the cleaner member 54A are joined with the fourth double-sided tape 56D, and then the upper surface wrapping portion 545 is penetrated into the slit 535 and the upper surface wrapping portion 545 is adhered to the fifth double-sided tape 56E previously adhered to the upper surface 534.

With the cleaning member 51D according to the fifth embodiment, the cleaner member 54A that wraps the pressing member 55 also wraps the upper surface 534 of the holding recess portion 53A by penetrating the slit 535.

Therefore, it is possible to realize a structure in which the pressing member 55 and the cleaner member 54A are firmly mounted to the holder 52A.

Sixth Embodiment

Figure 13:
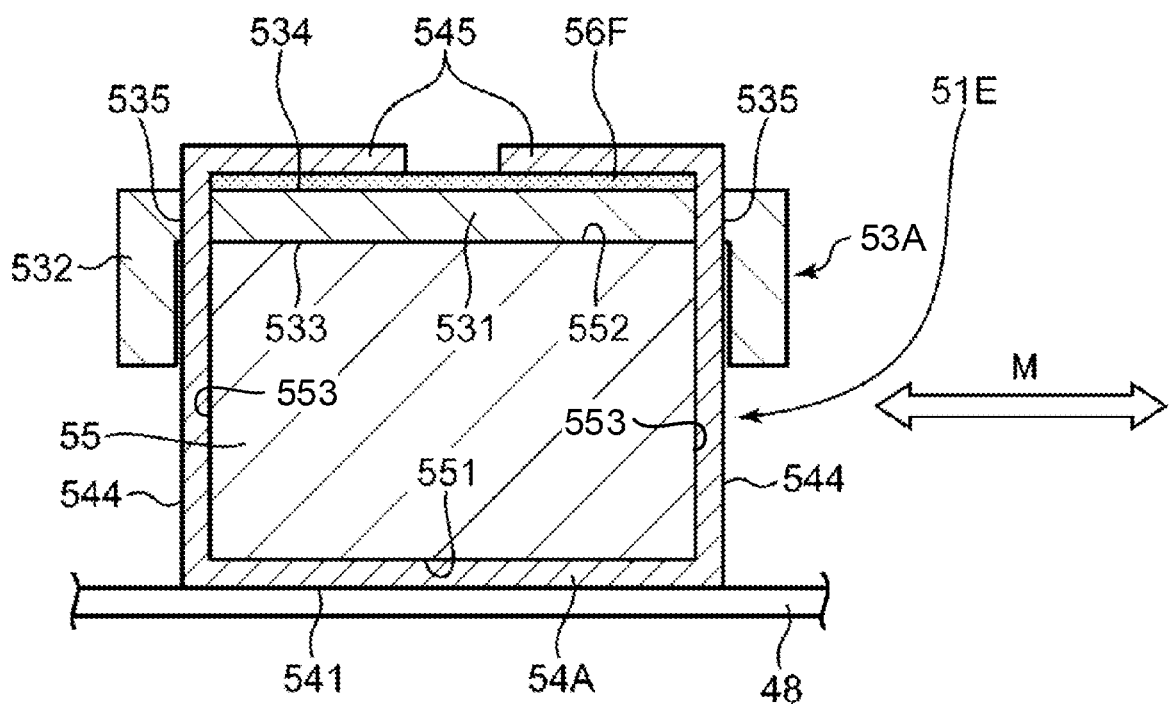
FIG. 13 is a cross-sectional view of a cleaning member according to a sixth embodiment.

FIG. 13 is a cross-sectional view of a cleaning member 51E according to a sixth embodiment. The sixth embodiment is also an embodiment using the holder 52A provided with the slit 535, but differs from the fifth embodiment in that the cleaning member 51E is fixed to the holder 52A by using only a single sixth double-sided tape 56F.

The cleaner member 54A of the cleaning member 51E is mounted to the pressing member 55 and the holder 52A in a manner to wrap the lower surface 551 and the pair of side surfaces 553 of the pressing member 55 and to wrap the upper surface 534 of the holding recess portion 53A through the slit 535. The sixth double-sided tape 56F is disposed between the upper surface wrapping portion 545 and the upper surface 534 of the holding recess portion 53A, and adheres both members together. On the other hand, the lower surface 551 of the pressing member 55 and the cleaner member 54A are not adhered.

In assembling, the lower surface 551 and the side surface 553 of the pressing member 55 are wrapped with the cleaner member 54A, the upper surface wrapping portion 545 is penetrated into the slit 535, and the upper surface wrapping portion 545 is adhered to the sixth double-sided tape 56F previously adhered to the upper surface 534. In this case, the upper surface 552 of the pressing member 55 is in a state of being pressed against the lower surface 533 of the holding recess portion 53. With the cleaning member 51E of the sixth embodiment, the number of double-sided tapes to be used can be reduced.

Seventh Embodiment

Figure 14:
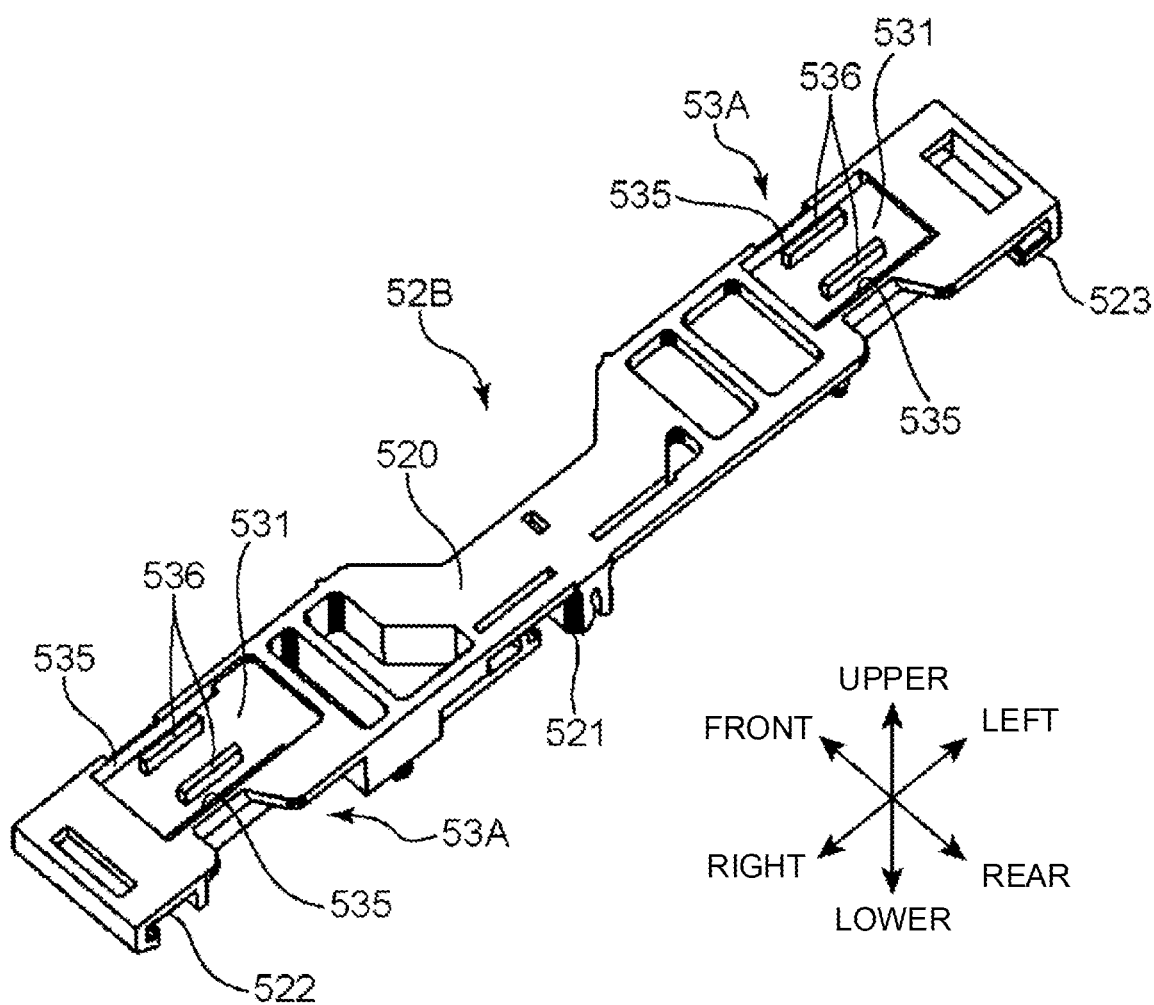
FIG. 14 is a perspective view of a holder to which a cleaning member according to a seventh embodiment is mounted.
Figure 15:
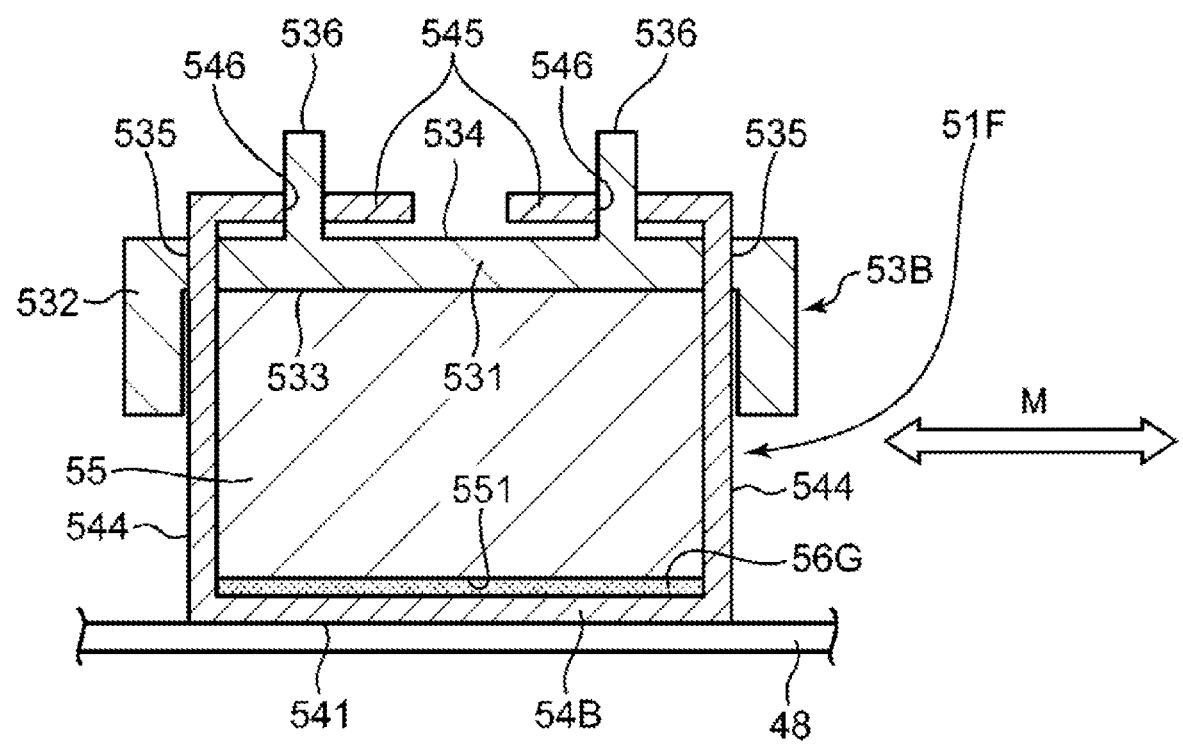
FIG. 15 is a cross-sectional view of the cleaning member according to the seventh embodiment.

FIG. 14 is a perspective view of a holder 52B used in a seventh embodiment, and FIG. 15 is a cross-sectional view of a cleaning member 51F according to the seventh embodiment mounted to the holder 52B. The holder 52B of the seventh embodiment differs from the previously shown holder 52A of FIG. 11 in that a pair of engagement protrusions 536 (engagement portions) are provided to protrude on the horizontal wall 531 of the holding recess portion 53A. The pair of engagement protrusions 536 are flat plate shaped protrusions disposed inside the pair of slits 535 and vertically protrudes from the upper surface 534 of the horizontal wall 531. The width in the left-right direction of the engagement protrusion 536 is narrower than the width in the left-right direction of the cleaner member 54B used in the cleaning member 51F.

The cleaner member 54B has a cleaning portion provided with the cleaning surface 541, a pair of side surface wrapping portions 544, and a pair of upper surface wrapping portions 545. Further, the pair of upper surface wrapping portions 545 are each provided with an engagement hole 546 which is fitted to the engagement protrusion 536. The cleaner member 54B wraps the lower surface 551 and the pair of side surfaces 553 of the pressing member 55, and wraps the upper surface 534 of the holding recess portion 53A through the slit 535. With the engagement hole 546 of the upper surface wrapping portion 545 fitted to the engagement protrusion 536, the cleaning member 51F is mounted to the holder 52B. The lower surface 551 of the pressing member 55 and the above cleaning portion of the cleaner member 54A are joined by a seventh double-sided tape 56G.

When the cleaning member 51F is to be assembled to the holder 52B, the lower surface 551 of the pressing member 55 and the cleaner member 54A are joined together by the seventh double-sided tape 56G. Then, the upper surface wrapping portion 545 is penetrated into the slit 535, and the engagement protrusion 536 provided to protrude on the upper surface 534 is fitted to the engagement hole 546. This fitting causes the upper surface 552 of the pressing member 55 to be pressed against the lower surface 533 of the holding recess portion 53.

With the cleaning member 51F of the seventh embodiment, the cleaning member 51F and the holder 52B can be integrated by the mechanical engagement of inserting the engagement protrusion 536 into the engagement hole 546, without using an adhesive member such as double-sided tape. Accordingly, the cleaner member 54B wrapping the pressing member 55 can be mounted to the holder 52B with a simple operation.

What is claimed is:

1. An optical scanning device, comprising:
   a housing that houses an optical system for generating a light ray for optical scanning, and has a window portion for emitting the light ray to an outside; and
   a cleaning system that is assembled to the housing and cleans the window portion, wherein
   the cleaning system includes a cleaning member, and a holder that holds the cleaning member, and with the holder moved in a specified movement direction relative to the window portion, the cleaning member cleans the window portion,
   the cleaning member includes:
   a cleaner member that is adapted to contact a surface of the window portion, and
   a pressing member that has a pressing surface for pressing the cleaner member toward the window portion and is formed of an elastic body, wherein
   in the movement direction, a width of the cleaner member is wider than a width of the pressing surface, and wherein
   the cleaning member further includes a double-sided tape that is disposed between the cleaner member and the pressing surface and joins the cleaner member with the pressing surface, and
   a width of the double-sided tape in the movement direction is wider than the width of the pressing surface while being narrower than the width of the cleaner member.

2. The optical scanning device according to claim 1, wherein
   the pressing member has a lower surface serving as the pressing surface and a pair of side surfaces rising from both end edges of the lower surface in the movement direction,
   the cleaner member is mounted to the pressing member in a manner to wrap the lower surface and the pair of side surfaces, and
   the wrapping with the cleaner member makes the width of the cleaner member in the movement direction wider than the width of the pressing surface.

3. The optical scanning device according to claim 2, wherein
   the pressing member is formed of a cuboid having the lower surface, the pair of side surfaces, and an upper surface opposite the lower surface,
   the cleaner member is mounted to the pressing member in a manner to wrap the lower surface, the pair of side surfaces, and the upper surface, and the holder includes a holding recess portion into which the upper surface of the pressing member wrapped with the cleaner member is fitted.

4. An image forming device, comprising:
an image carrier; and
the optical scanning device according to claim 1, wherein the optical scanning device irradiates a scanning light to the image carrier based on image information.

5. The optical scanning device according to claim 1, wherein
the cleaner member is formed of a sheet piece,
the pressing member is formed of a cuboid having the pressing surface on a lower surface, and
in the movement direction, a width of the sheet piece is wider than a side length of the cuboid.

6. An optical scanning device, comprising:
a housing that houses an optical system for generating a light ray for optical scanning, and has a window portion for emitting the light ray to an outside; and
a cleaning system that is assembled to the housing and cleans the window portion,
wherein
the cleaning system includes a cleaning member, and a holder that holds the cleaning member, and with the holder moved in a specified movement direction relative to the window portion, the cleaning member cleans the window portion,
the cleaning member includes:
a cleaner member that is adapted to contact a surface of the window portion, and
a pressing member that has a pressing surface for pressing the cleaner member toward the window portion and is formed of an elastic body,
wherein
in the movement direction, a width of the cleaner member is wider than a width of the pressing surface,
wherein
the pressing member has a lower surface serving as the pressing surface and a pair of side surfaces rising from both end edges of the lower surface in the movement direction,
the cleaner member is mounted to the pressing member in a manner to wrap the lower surface and the pair of side surfaces, and
the wrapping with the cleaner member makes the width of the cleaner member in the movement direction wider than the width of the pressing surface,
wherein
the pressing member is formed of a cuboid having the lower surface, the pair of side surfaces, and an upper surface opposite the lower surface,
the cleaner member is mounted to the pressing member in a manner to wrap the lower surface, the pair of side surfaces, and the upper surface, and
the holder includes a holding recess portion into which the upper surface of the pressing member wrapped with the cleaner member is fitted,
wherein
the cleaning member further includes a double-sided tape disposed at least at one portion between the lower surface of the pressing member and the cleaner member, between the upper surface of the pressing member and the cleaner member, or between the holding recess portion and the cleaner member, and
the pair of side surfaces of the pressing member and the cleaner member directly face each other.

7. An optical scanning device, comprising:
a housing that houses an optical system for generating a light ray for optical scanning, and has a window portion for emitting the light ray to an outside; and
a cleaning system that is assembled to the housing and cleans the window portion, wherein
the cleaning system includes a cleaning member, and a holder that holds the cleaning member, and with the holder moved in a specified movement direction relative to the window portion, the cleaning member cleans the window portion,
the cleaning member includes:
a cleaner member that is adapted to contact a surface of the window portion, and
a pressing member that has a pressing surface for pressing the cleaner member toward the window portion and is formed of an elastic body, wherein
in the movement direction, a width of the cleaner member is wider than a width of the pressing surface, wherein
the pressing member has a lower surface serving as the pressing surface and a pair of side surfaces rising from both end edges of the lower surface in the movement direction,
the cleaner member is mounted to the pressing member in a manner to wrap the lower surface and the pair of side surfaces, and
the wrapping with the cleaner member makes the width of the cleaner member in the movement direction wider than the width of the pressing surface, and wherein
the pressing member is formed of a cuboid having the lower surface, the pair of side surfaces, and an upper surface opposite the lower surface,
the holder includes a holding recess portion into which the upper surface of the pressing member is fitted, and a slit penetrating a wall surface that partitions the holding recess portion, and
the cleaner member is mounted to the pressing member and the holder in a manner to wrap the lower surface and the pair of side surfaces, and to wrap an upper surface of the holding recess portion through the slit.

8. The optical scanning device according to claim 7, wherein
the cleaning member further includes a double-sided tape disposed at least at one portion between the lower surface of the pressing member and the cleaner member, or between the upper surface of the holding recess portion and the cleaner member, and
the pair of side surfaces of the pressing member and the cleaner member directly face each other.

9. The optical scanning device according to claim 7, wherein
the upper surface of the holding recess portion is provided with an engagement portion that is mechanically engageable with the cleaner member.

* * * * *